Dec. 11, 1934.  A. MAZZA  1,984,073
PROCESS AND MACHINERY FOR THE MANUFACTURE OF ASBESTOS CEMENT
PIPES OF A SMALL DIAMETER AND OF LITTLE THICKNESS
Filed March 18, 1931  2 Sheets-Sheet 1
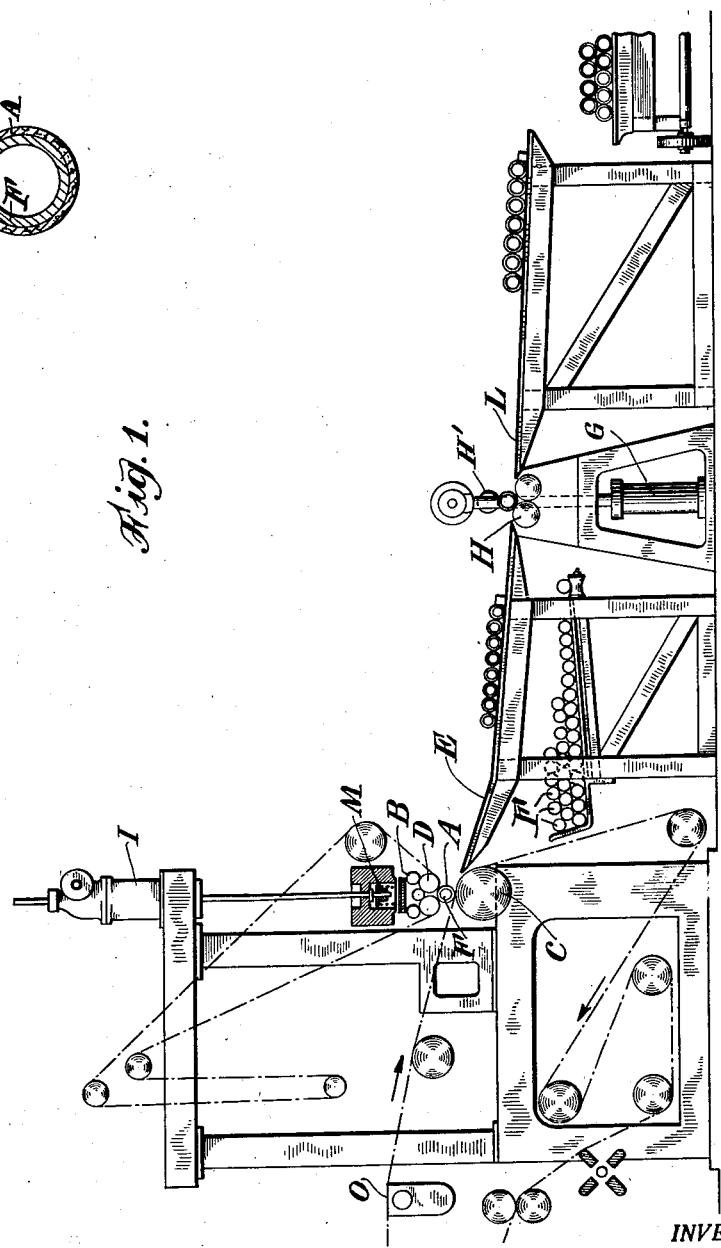
INVENTOR.
Adolfo Mazza.
BY D. H. Halstead
ATTORNEY.

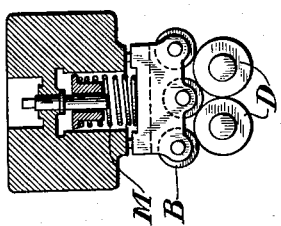
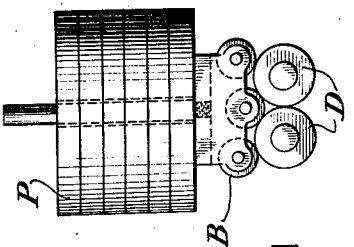
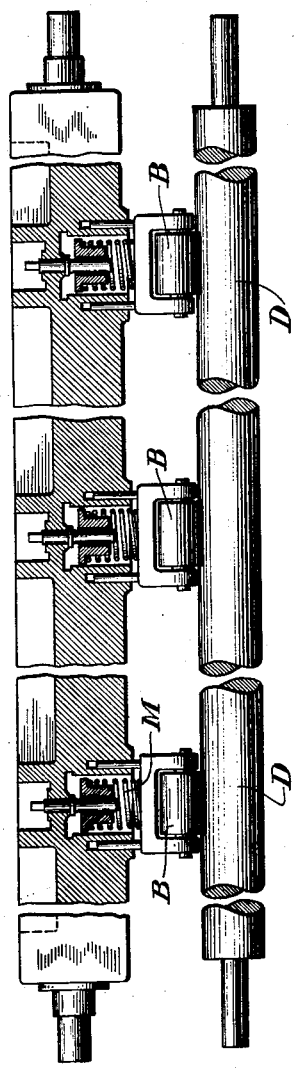
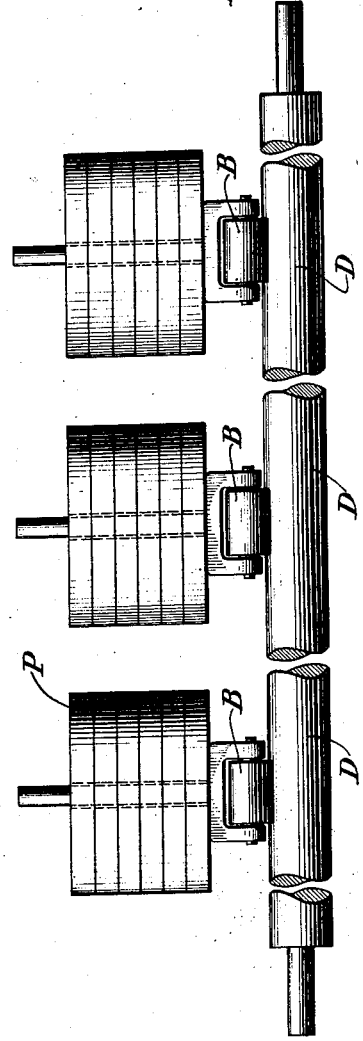

Patented Dec. 11, 1934

1,984,073

UNITED STATES PATENT OFFICE 1,984,073

PROCESS AND MACHINERY FOR THE MANUFACTURE OF ASBESTOS-CEMENT PIPES OF A SMALL DIAMETER AND OF LITTLE THICKNESS

Adolfo Mazza, Genoa, Italy, assignor to Johns-Manville Corporation, New York, N. Y., a corporation of New York Application March 18, 1931, Serial No. 523,512 In Italy March 22, 1930

4 Claims. (Cl. 92—66)

This invention relates to improved asbestos and cement pipes of small diameter and to a process and machine for the manufacture of the same.

Processes and machines for the manufacture of asbestos and cement pipes are well known. The present invention represents an improvement whereby there can be obtained, first, a greater rate of production of pipes of weight that can be easily handled by two men, say pipes of 50 to 200 mm. diameter, second, pipes of very small thickness of wall, say as little as 1 mm., third, pipes of smooth exterior, and fourth, pipes of wall composed of uniformly compressed material from end to end and from inside to outside.

In brief, the improvements over the prior art include the elimination of certain steps or operations, the substitution of simple manual insertion of light-weight cores for the more difficult insertion of solid cylinders or mandrels into the previous machines, the substitution of calendering within the forming machine by calendering outside, in a separate mechanism subject to better control, and/or provision of means for uniformly compressing the wall of the pipe during its formation.

A preferred embodiment of the invention is illustrated in the drawings in which

Fig. 1 is a vertical elevation, partly in section, of a machine for forming and calendering pipes of Portland cement and asbestos, or the like.

Fig. 1a is a cross section of such a pipe and its tubular core support.

Fig. 2 is a vertical front view, partly in section, of the means for securing uniform pressure on the pipe during the period of its formation.

Fig. 3 is an end view, partly in section, of the apparatus shown in Fig. 2.

Fig. 4 is a vertical front view of a modified means of securing uniform pressure upon a pipe during the period of its formation.

Fig. 5 is an end view of the apparatus illustrated in Fig. 4.

In the various figures, like reference characters denote like parts. Thus A is a wet, felted tube or pipe suitably of Portland cement and asbestos fibers. B is a series of rollers arranged in sets of 3 rollers each for supplying pressure to the pair of rollers D which serve to compress the felted tube A. C is a cylinder over which passes the felt O that is a part of a conventional millboard machine and carries a felted mixture of fiber and cementitious material, which becomes adhered to the core F and is built up around the core into a felted pipe. The core F consists suitably of a thin-walled metal pipe.

During the formation of the felted tube by winding a wet felt around a core, pressure is applied to the wound felt by the weight of the overlying rollers and also by pressure from the member I, suitably a pneumatic or hydraulic device for applying pressure to a plunger, transmitted through a rod to the spring M, which in turn presses downward upon the carriages for the sets of rollers B, or for raising the mechanism with the attached rollers B.

These sets of rollers B are spaced at close intervals over the pair of rollers D, that is, from end to end, so that the tendency of the rollers D to flex and give non-uniformity of compression and of wall thickness of the tube A is minimized. Furthermore, the same pressure may be carried upon the rollers D at all stages during the formation of a felted tube, in distinction from prior practice in which pressure was decreased as the tube increased in thickness of wall during its formation, as by a pressure control on the device I.

After the tube has been built up to its desired thickness, the tube with its supporting core is lifted from its support, by mechanical means, and allowed to roll down the incline E and is calendered in a calendering mechanism that is outside the forming machine. This permits replacing a core in position in the forming machine so that the forming machine may be operated almost continuously.

The calendering mechanism comprises a pair of power-driven inferior rolls H forming a cradle below the supported felted tube that is to be calendered, and a superior roll H' overlying the felt. Controllable and adjustable pressure is applied, as, for example, by the hydraulic means indicated generally by G, which pulls downward on the roller H', the rollers H being at a fixed elevation.

During the calendering operation, the circumference of the tube A is increased to an extent that facilitates the subsequent removal of the tube from the supporting core. The tube is caused to have a smooth exterior surface. While all the rolls have the same direction of rotation, there is a retarding effect of the upper roll which results in a smoothing action upon the surface of the tube A that cannot be had by the simple compression used in compacting a tube, as the tube forms, in a conventional process. Also, the calendering is controllable, in distinction from the severe compression previously used. The previous methods would weaken or completely ruin a wall as thin as 1 mm.

After the calendering operation is completed, the tube may be transferred by hand to the table L and then to a car or storage where the tubes are allowed to harden, at least in part, before the cores are removed. Finally, the tubes are allowed to season or harden completely, as by allowing the cement to take its final set.

In the modification of the apparatus illustrated in Figs. 4 and 5, a selected pressure is applied through the sets of rollers B to the rollers D, by placing weights P of selected and variable magnitude above the sets of rollers B.

In addition to the details that have been given, various conventional or previously described operations may be employed. Thus the operations up to the stage of collecting the fiber and a hydraulic cementitious material on the core F are the same as have been previously described and/or used commercially.

The product of the invention as indicated may be a seamless, small pipe of thin, uniformly compressed wall of uniform thickness. Such pipe has satisfactory strength for use in conveying gases or liquids, is non-corrodible, and has a wall that is strong and impermeable in proportion to its thickness, that is, stronger and more nearly completely impermeable to fluids than a pipe of the same dimensions made from the same materials by a conventional process. It will be understood that the thorough calendering to which the pipe is submitted and the fact that there is not a gradual lessening of the pressure on the wall of the pipe, during the period of its formation, contribute to the strength and impermeability of the wall.

What I claim is:

1. In the manufacture of small, seamless, thin-walled pipes of asbestos and Portland cement of wall thickness of the order of one millimeter, the step which comprises winding a wet felt of asbestos and Portland cement around a cylinder and compressing the wound felt at a pressure that is substantially constant during the entire winding process.

2. A calender adapted for use in calendering a supported wet tubular felt of asbestos fibers and Portland cement, said calender comprising two inferior metal rollers forming a cradle beneath the felt being calendered and a superior compression roller overlying the felt, the axes of the overlying roller and of the tubular felt lying in a line extending approximately at a right angle to a line extending between the axes of the inferior rollers.

3. The manufacture of pipes of Portland cement and asbestos fibers by a process comprising forming a wet felt of Portland cement and asbestos fibers, winding the felt around a mandrel or support, compressing the wound felt and calendering the outside of the completely wound felt in green condition against a metal surface.

4. In the manufacture of pipes having a seamless uniformly compressed wall of uniform thickness of asbestos and Portland cement, the step which comprises winding a wet felt of asbestos and Portland cement around a cylinder and compressing the wound felt at a pressure that is substantially constant during the entire winding process.

ADOLFO MAZZA.